United States Patent [19]

Weber

[11] Patent Number: 4,687,496

[45] Date of Patent: Aug. 18, 1987

[54] PROCESS FOR CLEANING A PACKED COLUMN

[75] Inventor: Gunter Weber, Linden, Fed. Rep. of Germany

[73] Assignee: Linde Aktiengesellschaft, Wiesbaden, Fed. Rep. of Germany

[21] Appl. No.: 853,076

[22] Filed: Apr. 17, 1986

[30] Foreign Application Priority Data

Apr. 17, 1985 [DE] Fed. Rep. of Germany ....... 3513809

[51] Int. Cl.$^4$ ............................................. B01D 53/14
[52] U.S. Cl. ........................................... 55/73; 55/90; 55/242; 55/233; 423/224; 134/22.12
[58] Field of Search ...................... 55/73, 90, 233, 242; 134/22.1, 22.12, 25.1, 32.34, 37; 423/224

[56] References Cited

U.S. PATENT DOCUMENTS

| | | | |
|---|---|---|---|
| 3,122,594 | 2/1964 | Kielback | 55/90 |
| 3,302,372 | 2/1967 | Hynson et al. | 55/233 X |
| 3,364,656 | 1/1968 | Whiton et al. | 55/233 X |
| 3,727,381 | 4/1973 | Kreimann | 55/242 |
| 4,166,730 | 9/1979 | Warhol | 55/233 |
| 4,533,367 | 8/1985 | Hadzismatlovic | 55/233 X |
| 4,537,752 | 8/1985 | Weber | 423/224 |

FOREIGN PATENT DOCUMENTS 1488659 10/1977 United Kingdom .

OTHER PUBLICATIONS

Kohl, Riesenfeld, "Gas Purification", Third Edition, pp. 476 following, 1979.

*Primary Examiner*—Charles Hart
*Attorney, Agent, or Firm*—Millen & White

[57] ABSTRACT

A process is disclosed for the cleaning of a clogged packed column. The packed column is utilized for gas cleaning in a scrubbing operation carried out with a scrubbing medium, and becomes plugged by deposits which form during operation. In order to be able to effectively and economically break up these deposits, the packed column is flooded, e.g., with a scrubbing medium, wherein the flooding fluid has a specific gravity greater than that of the particles of packing material. During the flooding of the packing, the deposits are broken up by flotation of the packing material. Preferably, the packed column can thus be utilized in scrubbing out $H_2S$ in an oxidative scrubbing process in which sulfur deposits form.

20 Claims, No Drawings

4,687,496

PROCESS FOR CLEANING A PACKED COLUMN

BACKGROUND OF THE INVENTION

1. Field of the Invention

The invention relates to a process for cleaning a packed column utilized for gas cleaning, in a scrubbing operation performed with a scrubbing medium; the column being plugged with formed deposits.

2. Description of the Prior Art

It is known from Ullmanns Encyklopaedie der Technischen Chemie 2: 591–595, 1972, to utilize packed columns as absorption apparatus. Packed columns are particularly suitable for gas cleaning because they provide large gas/liquid mass transfer areas and, thus, an especially effective scrubbing environment.

However, in one such embodiment, elemental sulfur is suspended in the scrubbing fluid from oxidative $H_2S$ scrubbing operations and forms deposits within the scrubbing column; for this reason, packed columns, i.e., columns containing pieces of packing material such as are well known to those in the art, are readily plugged, i.e., clogged, by elemental sulfur. This phenomenon is caused by a variety of formed deposits, and can also occur in other scrubbing operations, for example, metal sulfides or metal carbonyls in methanol scrubbing operations, phosphines in potash scrubbing operations and the like. In Ullmanns Encyklopaedie der Technischen Chemie 2: 595, 1972, it was recommended not to use packed columns in scrubbing operations if a danger of contamination from deposits existed.

OBJECTS OF THE INVENTION

An aspect of one object of the invention is to provide an effective, economic process for absorptive gas cleaning wherein packed columns can be utilized in a process even if there is a danger of plugging resulting from deposits contained in the scrubbing medium, or present in the gaseous stream to be cleaned, or which form during the scrubbing operation.

Upon further study of the specification and appended claims, further objects and advantages of this invention will become apparent to those skilled in the art.

SUMMARY OF THE INVENTION

Accordingly, this and other objects have been attained by a process for cleaning a packed column, especially a column utilized for gas cleaning in a scrubbing operation performed with a scrubbing medium, the column having become plugged with deposits, wherein the improvement comprises flooding the column with a fluid having a specific gravity greater than the specific gravity of the packing to move the packing upwardly in the column to dislodge the deposits and unplug the column.

DETAILED DISCUSSION

The invention involves the discovery that it is possible to break up the formed deposits present in the clogged column in an effective, economic manner. This decomposition is effected by flooding the packed column with a fluid, especially a liquid, whereby the packing elements are suspended, i.e., are buoyant in the fluid.

In this connection it is preferred that the specific gravity difference between the liquid and the packing elements be about 0.2 to 1.0, especially about 0.05 to 0.1.

In any case it is preferred that the packing elements have a specific gravity less than 1, especially in the range of 0.9 to 0.97 for polyetheylene, 0.9 for polypropylene.

Examples of pairs of packings and liquids include but are not limited to:

| Packing | Liquid |
| --- | --- |
| polyethylene | water or any aqueous system as $NaOH/H_2O$, amine/$H_2O$ $Na_2CO_3/H_2O$ |
| polypropylene | |
| polystyrene | |
| polyethylene | ether |
| hollow bodies made out of teflon | benzine |

The formed deposits are dislodged during the cleaning process because the packed column is partially blocked, e.g. 30% of total volume. Blocking normally starts at the gas inlet end of the column, i.e. with a counter-current fixed bed absorber at the bottom of the column. The column is flooded with liquor appr. 10%–20% higher than weight of packing, at least 40–50 cm. When liquor overfloods the packing, the free, i.e. non-blocked particles move upwards to the top of the liquor as single particles. If a few particles stick together due to blockages, they also can move upwards if their buoyancy is higher than the gravity in the liquor. Normally, the clumps break to single particles when they move upwards.

After all particles which are able to move upwards are collected below the surface of the liquor, there is a gap of free liquor between blocked and unblocked particles. When introducing a gas, e.g. air into the column, the free particles are set into a violent turbulence pushing to the blocked particles and thereby removing the blockage. As soon as a particle is set free it is also set into a turbulent movement thereby sustaining to set free the remaining still blocked particles.

With absorbers of a technical size an upward movement of the whole unit is very unlikely. As a precaution some suitable internals (e.g. crossed bars etc.) may be used. Also, a screen or other retaining means are not necessary, but helpful.

The packed column is structurally designed to retain a liquid; thus the packed column is properly equipped with valves and conduits for both feeding and discharging the liquid.

By filling the column with a liquid, preferably a scrubbing medium, a buoyancy of the packing elements is achieved; the formed deposits are broken up, with some pieces of deposits either falling to the bottom of the column from where they are discharged, or are removed from the column together with the scrubbing medium. In the latter case, if the deposits are lighter than the liquid, the scrubbing liquid is withdrawn from the top of the column and if heavier, from the bottom of the column.

In the broadest embodiment of the process, the packing elements should possess a specific gravity less than that of the flooding fluid, e.g., scrubbing medium. This is to enable the packing elements to be buoyant, or suspended in the fluid when the column is flooded by the flooding material. More particularly, the packing elements should possess a specific gravity of less than about 1.0, i.e., when the flooding fluid utilized is an aqueous solution.

Accordingly, by utilizing the process of this invention, it is possible to effectively and economically utilize packed columns even in those absorption processes wherein column plugging by deposits is to be expected. During cleaning of the packed column by utilizing the process of the invention, the packing material is not subjected to any damage.

In another embodiment, in order to further enhance breaking up of the clogged deposits, it is desirable to inject an inert gas such as air or $N_2$ or, preferably the raw feed gas, into the column during the flooding step. The gas is preferably injected into the bottom of the flooded column, and preferably so that the gas creates turbulence. Inert gas can be introduced either by a separate pipe or by the feed gas line.

An additional cleaning effect is attained by discharging the scrubbing medium, according to another preferred embodiment, from the flooded packed column at a high flow rate, such as 0.5-10 m/sec, preferably 2-5 m/sec, and most preferably 2-3 m/sec, i.e., as quickly as possible from a practical standpoint. As a result, the deposits broken up from the liquid flooding which have settled in the column bottoms are entrained in the fluid. It is frequently advantageous to repeat the flooding process at regular intervals, at least for precautionary purposes. Such a mode of operation is particularly effective if periodic plugging is expected. Depending on the particular gas scrubbing operation and thus on the particular plugged deposits, the packed column can be flooded hourly, daily, weekly, or at even longer appropriate intervals. In contrast thereto, if clogging occurs only occasionally, the process of this invention should only be utilized whenever necessary, i.e., at the onset of plugging. The process of this invention now permits an effective, economic use of packed columns in all scrubbing operations—chemical, physical, and chemical/physical—for gas cleaning, particularly, in such scrubbing procedures where periodic plugging from deposits occurs. Such processes are e.g. absorption methods using monoethanol amine or NaOH, whereby blockages may occur due to the formation of hydrocarbon polymerization products.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

EXAMPLE

In the oxidative scrubbing out of $H_2S$, sulfur is formed and plugs the packed column. In such a scrubbing operation the sulfur which has settled during the flooding step is to be withdrawn from the packed column. Since the density of the particular scrubbing liquor utilized in oxidative $H_2S$ scrubbing steps, consisting essentially of an aqueous alkali carbonate solution, is greater than 1, e.g., between 1.1 and 1.2 g/cm$^3$, the column packing pieces, for example, polyethylene or polypropylene, become suspended during flooding of the column with the scrubbing solution, and the plugged matter, comprising elemental sulfur, is broken up. The sulfur, having a density of 1.9 g/cm$^3$, drops to the bottom of the column. During the rapid draining of the scrubbing solution, at a flow rate of 2 m/sec into either a reaction vessel or oxidation reactor, the thus-settled elemental sulfur is entrained in the solution and removed. For additional details of oxidative scrubbing wherein sulfur is formed, reference is made to Kohl, Riesenfeld. "Gas Purification", 3rd. Edition, pages 476 ff.

For details of additional scrubbing systems to which the invention is applicable, reference is made to UK Pat. No. 1,488,659 and U.S. Pat. No. 4,537,752.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for operating a packed column containing particles of packing material utilized for gas cleaning in a scrubbing operation performed with a scrubbing medium, said process comprising; introducing gas to be scrubbed at a bottom portion of said column and introducing said scrubbing medium at a top portion of said column for counter-current scrubbing of said gas, and discontinuing scrubbing of said gas when said column has become at least partially plugged with deposits, wherein the improvement comprises flooding the plugged packed column by introducing a flooding fluid into the column to unplug the column thereby causing a portion, but not all, of said particles of packing material to move upwards, said flooding fluid having a specific gravity which is greater than the specific gravity of said packing material.

2. A process according to claim 1, wherein the packing material has a specific gravity of less than about 1.0.

3. A process according to claim 1, wherein scrubbing medium is utilized for the flooding fluid.

4. A process according to claim 3, wherein the flooding fluid is discharged from the flooded packed column at a flow rate ranging from about 0.5 to 10 m/sec.

5. A process according to claim 1, wherein the difference between the specific gravity of the flooding fluid and the packing material is about 0.2-1.0.

6. A process according to claim 1, wherein the difference between the specific gravity of the flooding fluid and the packing material is about 0.05 to 0.1.

7. A process according to claim 1, wherein said packing material is selected from polyethylene, polypropylene, or polystyrene and said flooding fluid is selected from water, an aqueous NaOH solution, an aqueous amine solution, or an aqueous $Na_2Co_3$ solution.

8. A process according to claim 1, wherein the flooding fluid is an aqueous alkali carbonate solution.

9. A process according to claim 1, wherein an effective amount of an inert gas is injected into the column during the column flooding.

10. A process according to claim 9, wherein the inert gas is air, nitrogen, or raw feed gas.

11. A process according to claim 10, wherein the inert gas is raw feed gas.

12. A process according to claim 1, wherein the flooding fluid is discharged from the flooded packed column at a flow rate ranging from about 0.5 to 10 m/sec.

13. A process according to claim 2, wherein the flooding fluid is discharged at a flow rate ranging from about 0.5 to 10 m/sec.

14. A process according to claim 1, wherein the flooding fluid is discharged at a flow rate of between 2-3 m/sec.

15. A process according to claim 1, wherein the flooding of the packed column with a flooding fluid occurs in an effective periodic manner.

16. A process according to claim 1, wherein the deposits which form in the packed column are broken up during the flooding step and either fall to the bottom of the column or are entrained in the flooding fluid and subsequently removed from the column.

17. A process according to claim 1, wherein the column packing are bouyant particles which are suspended in the flooding.

18. In a process for operating a packed column containing particles of packing material utilized for an oxidative scrubbing operation for scrubbing out $H_2S$ from a gas stream, said process comprising; introducing said gas stream at a bottom portion of said column and introducing a scrubbing medium at a top portion of said column for counter-current scrubbing of said gas stream, and discontinuing scrubbing of said gas stream when said column becomes at least partially plugged with sulfur deposited during the scrubbing operation, wherein the improvement comprises flooding the plugged packed column with a flooding fluid thereby causing a portion, but not all, of the particles of packing material to move upwards and deposited sulfur formed during the scrubbing operation to drop down during flooding, said flooding liquid having a specific gravity greater than the specific gravity of the particles of packing material, and withdrawing dropped sulfur from the packed column.

19. A process according to claim 1, wherein the scrubbing medium has a density of about 1.1 to 1.2 $g/cm^3$.

20. A process for cleaning a packed column containing packing elements and deposits which plug the column, said process comprising flooding the column with a fluid having a specific gravity higher than the specific gravity of the packing, thereby moving to the packing in an upward direction and dislodging the desposits, and removing the dislodged deposits from the column.

* * * * *